C. E. CARGILL.
FLY TRAP.
APPLICATION FILED MAR. 2, 1916.
1,201,801.
Patented Oct. 17, 1916.
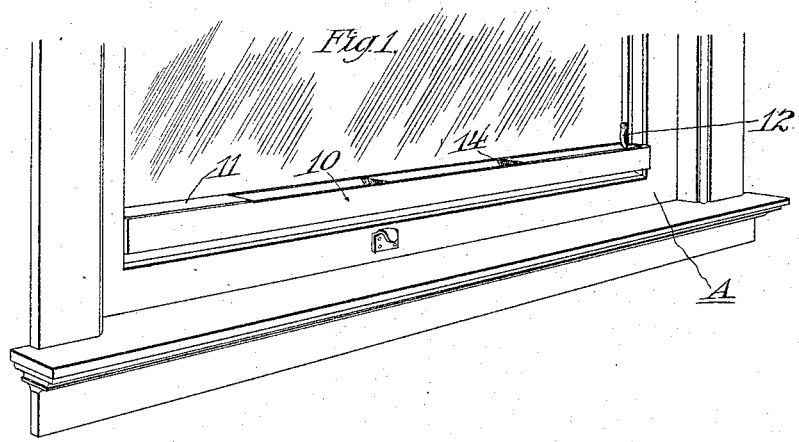
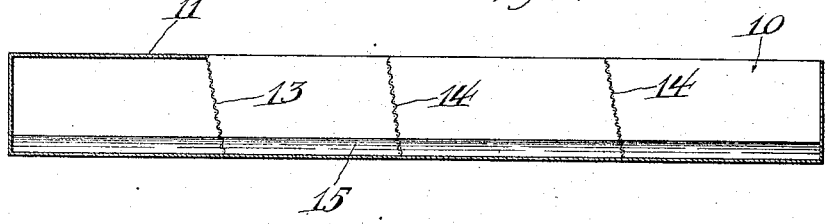
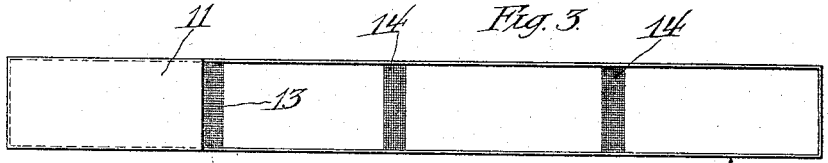
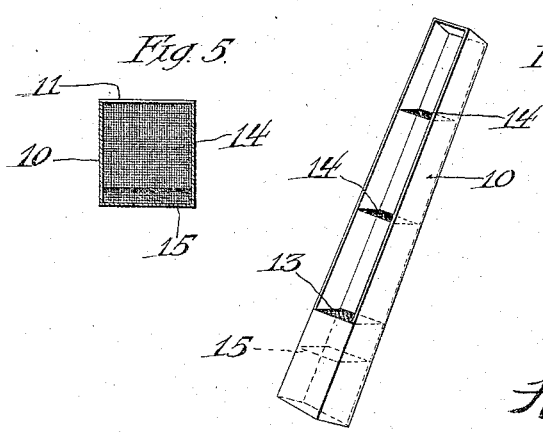
Inventor
Charles E. Cargill
by
Hazard Berry & Miller
his Attorneys.

UNITED STATES PATENT OFFICE.

CHARLES E. CARGILL, OF LOS ANGELES, CALIFORNIA.

FLY-TRAP.

1,201,801.　　　　　Specification of Letters Patent.　　Patented Oct. 17, 1916.

Application filed March 2, 1916. Serial No. 81,714.

*To all whom it may concern:*

Be it known that I, CHARLES E. CARGILL, a citizen of the United States, residing at Los Angeles, in the county of Los Angeles and State of California, have invented new and useful Improvements in Fly-Traps, of which the following is a specification.

My invention relates to a fly trap and in particular to a fly trap in which the flies are caught by means of a liquid.

It is an object of this invention to construct a fly trap in the shape of a longitudinal tray which is adapted to be removably attached at the bottom and close against the glass of windows. The trap is in the shape of an oblong box, open at the top, in which a suitable fly killing liquid is placed. The flies which fall into the liquid may be removed at suitable intervals by taking the box off the window, tilting the same on one end, thereby causing the liquid to flow into the reservoir provided at the lower end. One or more screens or perforated baffle plates are transversely mounted in said box, which allow the liquid to flow into the reservoir, but retain the dead flies. By giving the bottom of the fly trap a slight blow, the flies will be dislodged from the screens and thrown out from the trap. By tilting the trap again into its normal horizontal position, the liquid will drain back and the trap is again ready for operation.

Another object of this invention is to devise a fly trap which is exceedingly simple in construction and positive in operation, and from which the dead flies may be instantly removed without the necessity of draining off the fly killing liquid therefrom.

My invention will be better understood with the aid of the accompanying drawings, in which:

Figure 1 shows my device attached to a window glass. Fig. 2 is a longitudinal vertical cross section thereof. Fig. 3 is a top plan view thereof. Fig. 4 is a perspective view showing the same tilted in its upright position preparatory to removing the flies. Fig. 5 is a detail view of the baffle plate.

Referring to the drawings, the fly trap consists of an oblong box 10 preferably of a length to extend across the bottom of a glass on a door or window. I have shown the box to be rectangular in cross section, although the shape is immaterial, and one having semi-cylindrical or V shaped cross section may be substituted therefor. The box is open throughout its length except at one end where a fixed top plate 11 is provided. The top plate, with the adjacent part of the box, constitutes a reservoir section at the lower end. The device is removably attached to the window A by fastening devices 12 of any suitable construction. From the inner end of the top plate 11, a screen or perforated baffle plate 13 is mounted transversely to the length of the box. Intermediate said screen 13 and the other end of the box 10, one or more screens or baffle plates 14 are transversely mounted therein, the screens 13 and 14 being preferably inclined from the vertical with their upper ends toward the reservoir section.

In the operation of the device, a suitable fly killing liquid 15 is poured into the box 10. The device is placed preferably at the bottom of a window, for the reason that at that place, the flies will congregate especially if the shade be drawn, leaving only a small lower section of the window exposed to the light. When it is desired to remove the dead flies from the container which float in the fly killing liquid 15, the device is removed from the window and tilted on its reservoir end. This will cause the liquid to flow into the reservoir, the baffle plates 13 and 14 in addition to keeping out the flies, preventing the slopping of the liquid. When the device is tilted, a slight tap or blow on the bottom of the box will loosen the flies which adhere to the bottom and sides of the box and to the baffle plates and eject them from the trap.

It is thus seen that I have devised an extremely simple yet efficient liquid fly trap, which permits of the rapid and easy removal of the dead flies without the necessity of removing the liquid from the fly trap or of skimming off the flies floating in the liquid.

I claim:

1. A fly trap comprising an oblong box open at the top, means for attaching the same removably to a window glass, said box being adapted to contain a fly killing liquid, a reservoir at one end of said box adapted to hold said liquid when the box is tilted on its reservoir end, a transverse screen between said reservoir and the open portion of said box, and one or more transverse screens in the open portion of said box, said screens being mounted obliquely with their upper ends toward said reservoir.

2. A fly trap comprising an oblong box open at the top, said box being adapted to contain a fly killing liquid, a reservoir section on one end adapted to hold the liquid when the fly trap is tilted on its reservoir, and a screen partition between said reservoir and said box.

3. A fly trap comprising an oblong box adapted to contain a fly killing liquid, a reservoir at one end of said box adapted to hold said liquid when said box is tilted on its reservoir end, and a screen mounted transversely in said box.

In testimony whereof I have signed my name to this specification.

CHARLES E. CARGILL.

Copies of this patent may be obtained for five cents each, by addressing the "Commissioner of Patents. Washington, D. C."